United States Patent [19]

Bott

[11] 4,431,082
[45] Feb. 14, 1984

[54] VEHICLE LADDER

[76] Inventor: John A. Bott, 931 Lakeshore Dr., Grosse Pointe Shores, Mich. 48236

[21] Appl. No.: 335,702

[22] Filed: Dec. 30, 1981

[51] Int. Cl.³ .............................................. E06C 5/00
[52] U.S. Cl. .................................... 182/127; 182/93; 182/36; 182/129
[58] Field of Search ............... 182/127, 93, 92, 82, 182/206, 99, 36, 38, 39, 129, 84; 224/321, 324, 309, 315

[56] References Cited

U.S. PATENT DOCUMENTS

| 740,382 | 9/1903 | Oestreicher | 182/38 |
|---|---|---|---|
| 2,727,793 | 12/1955 | Riccluti | 182/129 |
| 2,767,032 | 10/1956 | Mitchell | 182/84 |
| 2,840,290 | 6/1958 | Roberts | 182/39 |
| 2,942,609 | 6/1960 | Ferguson | 182/206 |
| 2,957,541 | 10/1960 | Everest | 182/206 |
| 3,498,410 | 3/1970 | Storch | 182/206 |
| 3,512,608 | 5/1970 | Huntley | 182/93 |
| 3,605,943 | 9/1971 | Beaudet | 182/127 |
| 3,776,437 | 12/1973 | Carney | 224/321 |
| 4,099,658 | 7/1978 | Bott | 224/42.1 F |
| 4,132,335 | 1/1979 | Ingram | 324/324 |
| 4,239,139 | 12/1980 | Bott | 224/324 |
| 4,274,568 | 6/1981 | Bott | 224/319 |

Primary Examiner—R. P. Machado
Assistant Examiner—Alvin Chin-Shue
Attorney, Agent, or Firm—Harness, Dickey & Pierce

[57] ABSTRACT

A ladder for a vehicle having a top surface vertically elevated to a height not easily accessible to a person, which ladder is capable of being integrated into elements of an adjustable and removable article carrier or a slat of a slat-type article carrier, comprising a pair of side members spanned by steps or braces having upper securement elements or retainers at one end of the side members insertable into engagement with the article carrier and lower securement elements, such as suction cups, engageable with the side of the vehicle to secure the ladder in place.

6 Claims, 5 Drawing Figures

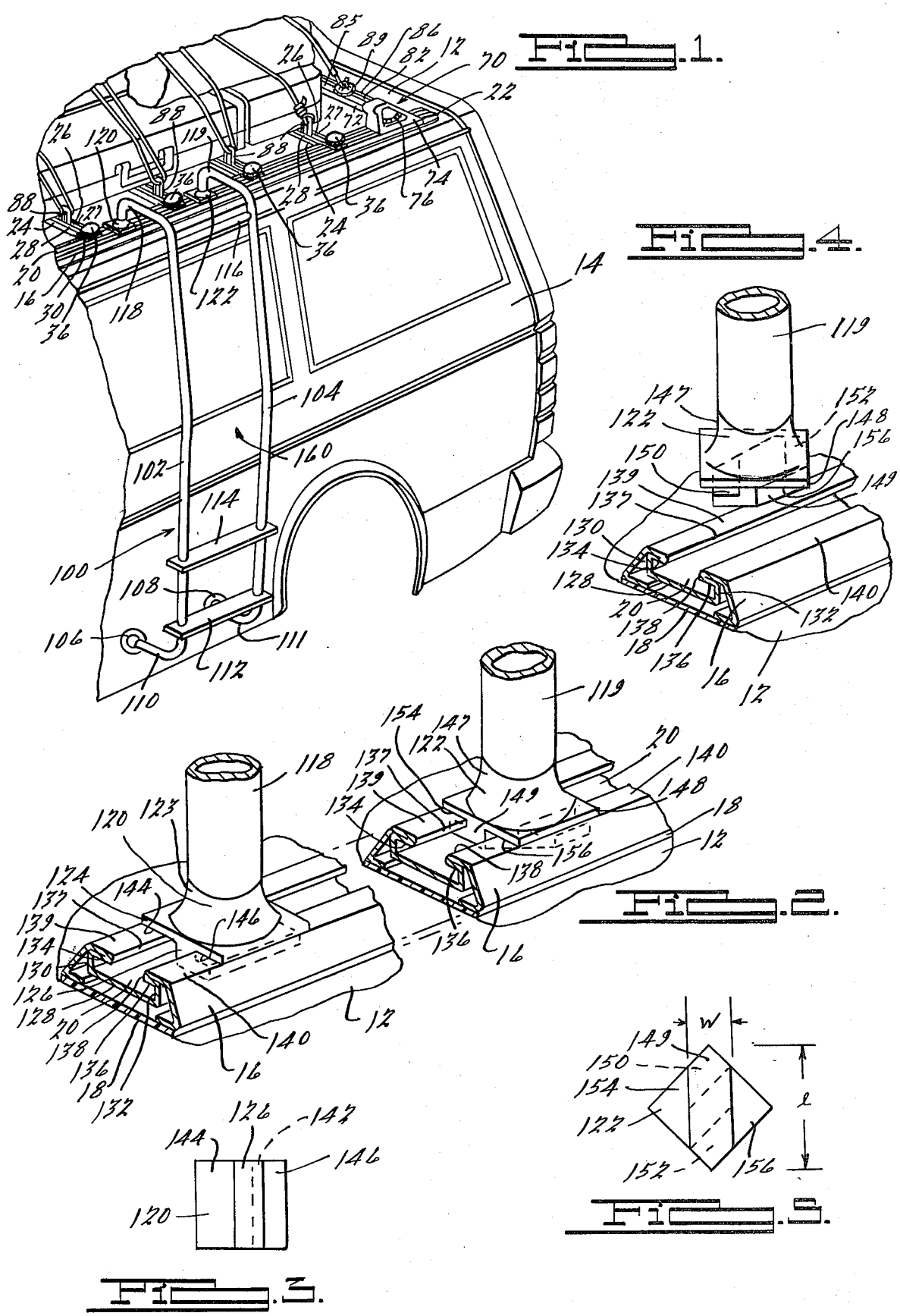

VEHICLE LADDER

BACKGROUND AND SUMMARY OF THE INVENTION

The present invention relates generally to ladders and vehicle article or luggage carriers and more particularly to a new and improved vehicle ladder to aid in the disposition of luggage or articles on a luggage carrier of a van, bus, or similar vehicle. More specifically, the ladder of the present invention is of a type which is capable of being integrated into elements of an adjustable and removable article carrier.

The present invention has as one object to provide a ladder for ready access to the top surface of a van, bus, or similar vehicle in order to load an article carrier disposed on that top surface. The ladder provided in the present invention is readily removable from the vehicle to be stored in the vehicle or other suitable storage place.

As stated above, a second object of the invention is that the ladder would be capable of being integrated into an article carrier having adjustable and removeable components, similar to that a slat-type article carrier disclosed in applicant's prior patents, such as U.S. Pat. No. 4,099,658, issued to applicant on July 11, 1978. The ladder of the present invention has the object of being capable of integration with a slat-type article carrier without inhibiting any of the myriad of features and optional accessories offered as uses of the slat-type article carrier.

The ladder of the present invention further has the object of providing a ready access to load an article carrier on the top surface of the van, bus, or similar vehicle from either side of the vehicle and at various locations along either side of the vehicle.

Other objects and advantages of the present invention will become apparent from the following detailed description taken in conjunction with the following drawings.

BRIEF DESCRIPTION OF THE DRAWINGS

FIG. 1 is an elevated perspective view of a ladder of the present invention as mounted on a van with a slat-type article carrier mounted thereon;

FIG. 2 is an enlarged view of the upper portion of FIG. 1 where the ladder and the article carrier are secured together;

FIG. 3 is an elevated bottom view of one of the upper securement elements of the ladder of the present invention;

FIG. 4 is a view of the other of the upper securement elements of the present invention in disassembly; and FIG. 5 is a bottom elevated view of the upper securement element illustrated in FIG. 4.

DETAILED DESCRIPTION OF THE PREFERRED EMBODIMENT

Referring now in detail to the drawings and in particular FIG. 1 thereof, a vehicle article carrier 10 is shown in operative association with a generally horizontally disposed roof surface 12 of typical van, bus, or similar vehicle 14 when the horizontally disposed surface 12 is vertically elevated to a height not easily accessible to a person without a ladder or other form of elevational device. Generally speaking, the article carrier 10 comprises a pair of laterally spaced, longitudinally extending slats 16 which are secured upon the roof surface 12 in positions adjacent the lateral sides thereof similar to that illustrated and described in applicant's U.S. Pat. No. 4,239,139, issued to applicant on Dec. 16, 1980. Preferably the slats 16 are of uniform cross sectional shape along their entire length. Each of the slats 16 has channels 20 defined therewithin and co-extensive of the length of the slats 16. Slats 16 are fixedly secured to the vehicle roof surface 12 by means of suitable longitudinally spaced fastening elements (not shown) which extend downwardly through suitable openings in the base of the slats 16 and are secured to suitable fastening elements bonded within the roof surface 12. Preferably, a suitable resilient or elastomeric pad 18 is provided interjacent the underside of the slats 16 and the confronting portion of the vehicle roof surface 12. Additionally, the opposite ends of each of the slats 16 are preferably provided with suitable end caps 22 which may be secured in place by the same fastening elements which secure the slats 16 to the roof surface 12.

The article carrier 10 in many general respects is similar to the luggage racks described in applicant's above-referenced U.S. Pat. Nos. 4,099,658 and 4,239,139, which disclosures are incorporated herein by reference. The article carrier 10 further comprises a plurality of transversely or laterally extending cross members or cross slats, generally designated with the numeral 24, which also include a longitudinally extending channel 26, having support surfaces 27 and 28 associated on both sides of the channel, and having clamping means associated with the interior of the channel 26. Each of the cross slats 24 is provided with an end fitting 30 which is provided, in turn, with a suitable aperture through which a suitable threaded stud may extend for threadable engagement with the clamping means of the associated slat 16. The vertically upper portion of the threaded stud comprises a manually engageable portion 36. Thus, the cross slats 24 are slidable longitudinally along the slats 16 to be positioned operably at any location along the slats 16. Cross members 24 are also readily removable by removal of the threaded studs from the clamping means of the slats 16.

The article carrier 10 may also include vertically elevated cross rail members 70 comprising a cross rail 72 mounted between two stanchion elements 74. The stanchion elements 74 each have an aperture through which is disposed a manually engageable threaded stud element 76 which is operably associated with clamping means within the slats 16. The elevated cross rail 72 is preferably of an aerodynamic cross section and includes a longitudinally extending channel 82 including clamping means of the interior thereof and support surfaces 85, 86 extending on both sides thereof.

Tie down members 88 or 89 may be operably associated with the interior channel portions of either the slats 16, the cross members 24, or the cross rail members 70.

In a van, bus, or similar vehicle, the top surface or roof surface 12 may be anywhere from six to ten feet above the ground. The ladder 100 of the present invention, is illustrated FIG. 1, aids in accessing the top of the van, bus, or similar vehicle to load articles or luggage onto the article carrier. The ladder 100 comprises two parallel substantially C-shaped elongated side members 102 and 104 having lower securement elements or suction cups 106 and 108 at the lower ends 110 and 111 thereof and steps 112 and 114 adjacent the suction cup lower ends 110 and 111 spanning the two elongated members 102 and 104. A cross brace 116 is also included adjacent the upper ends 118 and 119 of the C-shaped members to connect that portion also. Upper securement elements or retainers 120 and 122 are operably associated with the C-shaped members 102 and 104 adjacent the upper ends 118 and 119 thereof. The retainer constructions 120, 122 are shown in FIGS. 3, 4 and 5. One of the retainers 120 is a clip-on retainer and the other retainer 122 is a retainer which is rotated in order to engage with the slat 16.

The clip-on retainer 120 has a base section 124 including an engagement element 126, having an L-shaped transverse cross-section, which extends into the channel 20 of the corresponding slat 16. The channel 20 is comprised of a base portion 128, two sidewall portions 130 and 132 and a pair of upper surfaces 134 and 136 disposed on a pair of upper slat portions 137 and 138 extending and directed toward one another from the sidewalls 130 and 132, respectively. The slat 16 further comprises a pair of upper article supporting surfaces 139 and 140 coextensive with the length of the slat 16 and disposed one on each side of the channel 20.

Retainer 120 further comprises an interior recess 142 and a pair of lower engagement surfaces 144 and 146. The retainer 120 is engaged to the slat 16 by the placement of the engagement element 126 into the channel 20 as shown, positioning the one of the upper slat portions 137 and 138 closest to the outer edge of the roof surface 12 within the recess 142 of the retainer 120 to also position lower engagement surfaces 144 and 146 upon the upper article supporting surfaces 139 and 140, respectively, of the slat 16.

The other retainer 122 is configured so that placement and displacement with the slat 16 involves rotation of the retainer 122. Since the retainer 122 is fixedly secured to the side member 104 of the ladder 100, the construction of the retainer 122 also means that the entire ladder 100 must be rotated about an axis through the retainer 122 in order to place the retainer 122 into engagement with the slat 16 or displace the retainer from the slat 16.

The retainer 122 includes an upper portion 147, fixedly engaged to one end 119 of one side member 104 of the ladder, and a lower portion 148. Referring to FIGS. 2, 4 and 5, lower portion 148 has an engagement element 149 and two recesses 150 and 152 in the element 149 on opposite sides thereof. The upper portions of the recesses 150 and 152 comprise lower engagement surfaces 154 and 156. The engagement element 149 (FIG. 5) has a width (w) less than the width of the channel 20 at its smallest and uppermost dimension (between upper article supporting surfaces 139 and 140) so that it may be placed into the channel 20 from above the slat 16. The length (l) of the element 149 is greater than the width (w) so that after insertion into the slat 16, the element 149 may be rotated forty-five degrees around its vertical axis to be secured against displacement from said slat 16 without further rotation. The recesses 150 and 152 are engageable with the upper slat portions 137 and 138 with lower engagement surface 154 and 156 disposed on the upper article supporting surfaces 139 and 140, respectively, of the slat 16.

Thus, to position the ladder 100 on the vehicle 14, the ladder 100 is disposed so that the steps 112, 114 and the cross brace 116 form approximately a forty-five degree angle with the side 160 of the vehicle 14. In this position, the engagement element 149 of the first retainer 122 is placed into the channel 20 of the slat 16. The ladder 100 is then turned so that the steps 112, 114 and brace 116 are then disposed parallel to the side 160 of the vehicle 14 and the engagement element 126 of the second retainer is inserted into the channel 20 into engagement with the slat 16. Then the suction cups 106 and 108 are engaged with the side 160 of the vehicle 14 to clampingly engage the engagement elements 126 and 149 of the retainers 120, 122 with the slat 16 and secure the ladder 100 in its operable position. The ladder 100 may be readily removed by simply reversing the sequence of above-described assembly steps. The suction cups 106 and 108 provide effective securement without marring the painted finish of the vehicle 14.

Alternatively, the retainer 122 may be rotatably secured to the side member 104 so that only the retainer 122 may need to be rotated to engage and disengage the retainer 122 from the slat 16.

The ladder 100 may be mounted on either side of the vehicle 14 and even may be mounted at the rear of the vehicle if a suitable slat or cross member is mounted transversely near the rear edge of the vehicle roof surface 12.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. With a vehicle having an elevated top surface and sidewalls, a vehicle ladder for access to said elevated top surface of a vehicle, comprising a pair of elongated side members;

step means spanning said side members at substantially one end thereof; and means for securing said ladder to said vehicle, comprising an article carrier disposed on said top surface, having at least one elongated member secured to said surface having a longitudinally extending channel, upper means for attachment of said side members to said article carrier elongated members including means for removeably engaging one end of each of said pair of elongated side members to one of said article carrier elongated members and operably associated with said channel comprising retainer members having engagement portions, at least one of which retainer members is insertable into said channel when the plane formed by the longest portion of said elongated side members forms an angle with said associated vehicle sidewall corresponding with alignment of said at least one retainer member engagement portion with said channel, and lower means for attachment of said side members to said sidewalls, wherein said upper and lower attachment means cooperate to removeably secure said side members and step means to said vehicle at any selected position along the length of said channel to provide ready access to the elevated top surface of the vehicle.

2. A vehicle ladder in accordance with claim 1, wherein said means for removeably engaging and elongated member comprise retainer members at the upper end of each of said elongated side members of said ladder insertable into said channel.

3. A vehicle ladder in accordance with claim 1, wherein said lower attachment means includes means for protecting the surface finish of the vehicle sidewall during installation, use, and removal of the ladder with respect to the vehicle.

4. With a vehicle having an elevated top surface and sidewalls, a vehicle ladder for access to said elevated top surface of a vehicle, comprising
   a pair of elongated side members;
   step means spanning said side members at substantially one end thereof; and
   means for securing said ladder to said vehicle, comprising
      an article carrier disposed on said top surface, having at least one elongated member secured to said surface, said elongated member having a channel extending longitudinally therein,
      upper means for attachment of said side members to said elongated members, including means for removeably engaging one end of each of said pair of elongated side members to said elongated members comprising retainer members one of which is insertable into said channel when the plane formed by the longest portions of said elongated side members forms an angle of approximately forty-five degress with said associated vehicle sidewall, and the other of which retainer members is insertable into said channel when the plane formed by the longest portions of said elongated side members is at least substantially parallel to said associated vehicle sidewall,
      lower means for attachment of said side members to said sidewalls,
      wherein said upper and lower attachment means cooperate to removeably secure said side members and step means to said vehicle to provide ready acccess to the elevated top surface of the vehicle.

5. In combination with an article carrier adapted to be secured to a generally horizontally extending vertically elevated top exterior body surface of a motor vehicle, comprising at least one elongated article carrier member secured upon the surface of said vehicle, having upper article supporting surfaces on the upper sides of said elongated article carrier member, and a longitudinally extending channel, the improvement comprising:
   a pair of elongated side members, each having an upper and a lower end;
   step means spanning said side members at substantially the lower ends of said side members; and
   means for securing said side members to said vehicle at a selected position along the length of said channel of said article carrier member, comprising
      upper means for attachment of said side members at the upper ends thereof to said channel of said elongated article carrier member, including means for removeably and adjustably engaging one end of each of said pair of elongated side members with the channel of said elongated article carrier member, comprising a pair of retainer elements having major and minor dimensions perpendicular to one another, said major dimension of said first retainer element being capable of forming an angle with said second retainer element major dimension wherein said first and second elements are serially inserted into said channel to engage said elongated article carrier member; and
      lower means for attachment of said side members at the lower ends thereof to said sidewalls,
      wherein said upper and lower attachment means cooperate to removably secure said side members, and thereby said step means, to said vehicle at any selected position along the length of said channel to provide access to said elevated top surface.

6. An article carrier system for supporting and securing articles on a generally horizontally extending exterior vertically elevated top body surface of an automobile, comprising a pair of elongated slats on said surface extending in positions substantially parallel to one another, means permanently securing said slats to said body in said positions, said slats being substantially rectangular in vertical cross section with a width substantially greater than the height of the section, the tops of said slats being substantially flat and parallel to said horizontal surface and providing means on which articles may be rested and supported above said surface, at least one elongated cross member extending transversely of said slats and having end portions slideable along the lengths of the respective slats and removeably mounted on said slats, the improvement comprising ladder means removeably secured to one of said elongated slats to provide ready access to said elevated top surface of said vehicle, including means for locking said ladder means at any selected position along the length of said one slat comprising
   upper means for attachment of said side members at the upper ends thereof to said channel of said elongated article carrier member, including means for removeably and adjustably engaging one end of each of said pair of elongated side members with the channel of said elongated article carrier member, comprising a pair of retainer elements having major and minor dimensions perpendicular to one another, said major dimension of said first retainer element being capable of forming an angle with said second retainer element major dimension wherein said first and second elements are serially inserted into said channel to engage said elongated article carrier member; and
   lower means for attachment of said side members at the lower ends thereof to said sidewalls,
   wherein said upper and lower attachment means cooperate to removeably secure said side members, and thereby said step means, to said vehicle at any selected position along the length of said channel to provide access to said elevated top surface.

* * * * *